April 9, 1940.  W. E. McLAUGHLIN  2,196,639
FLYING CUT-OFF MACHINE
Filed July 13, 1937  4 Sheets-Sheet 1
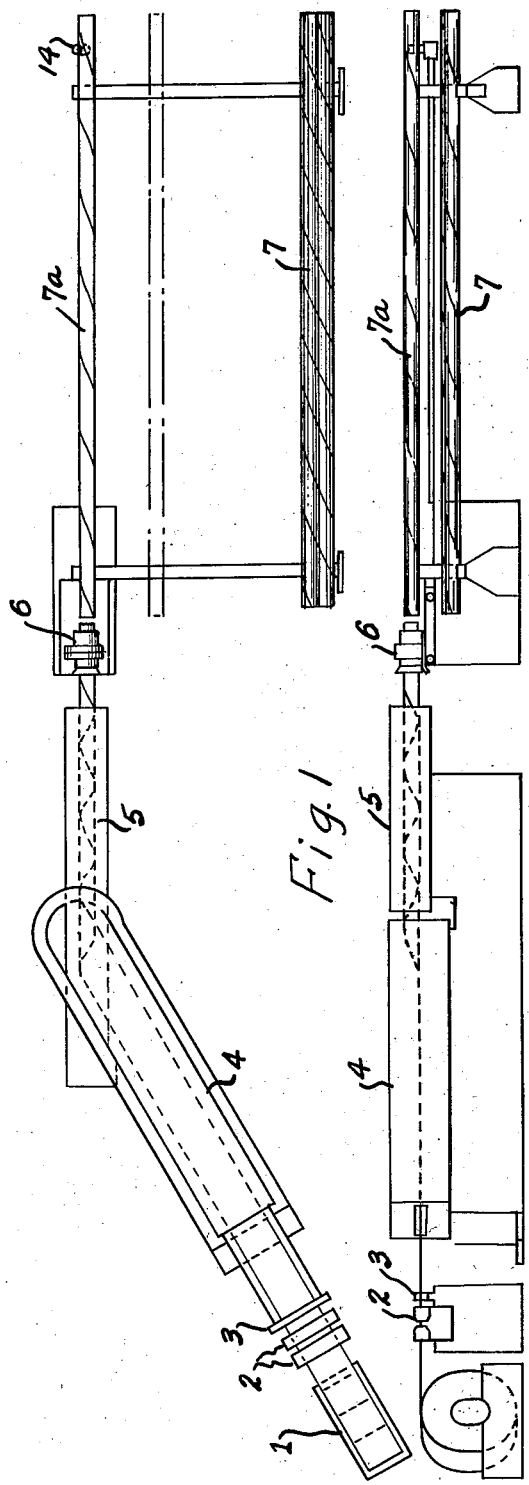
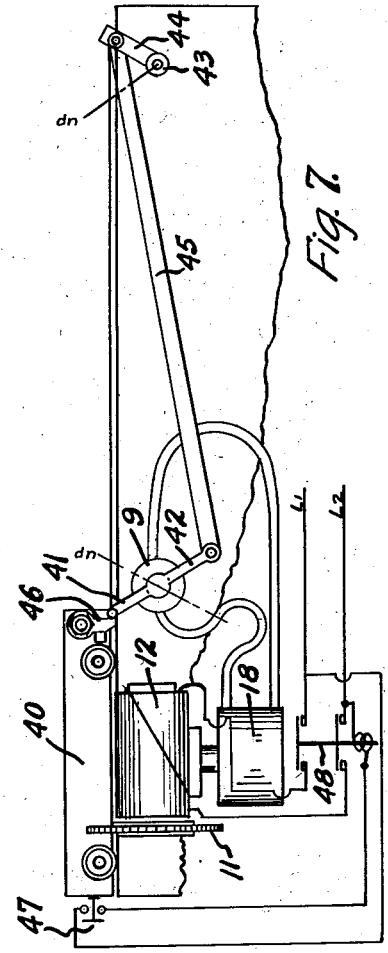
INVENTOR
WILLIAM E. McLAUGHLIN.
BY Allen & Allen
ATTORNEYS.

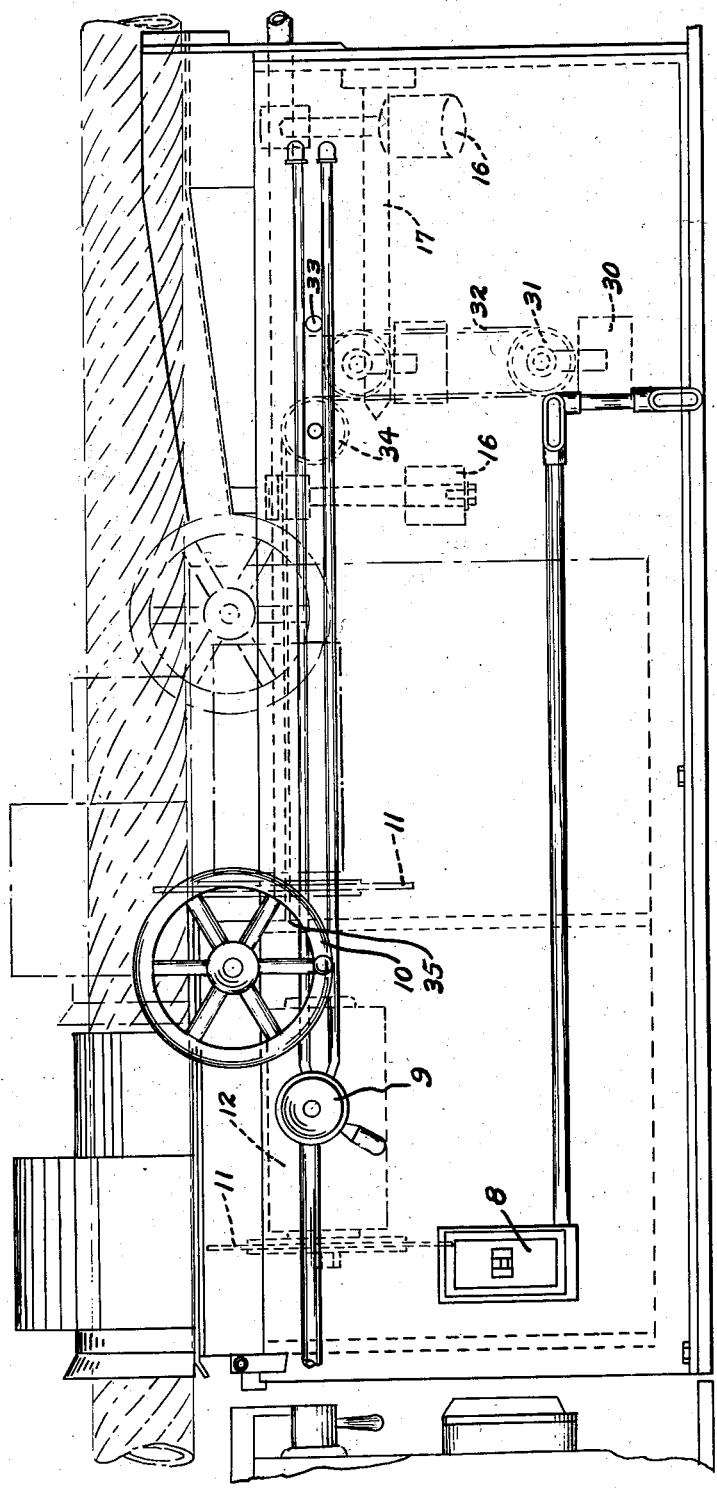

April 9, 1940.  W. E. McLAUGHLIN  2,196,639
FLYING CUT-OFF MACHINE
Filed July 13, 1937  4 Sheets-Sheet 4
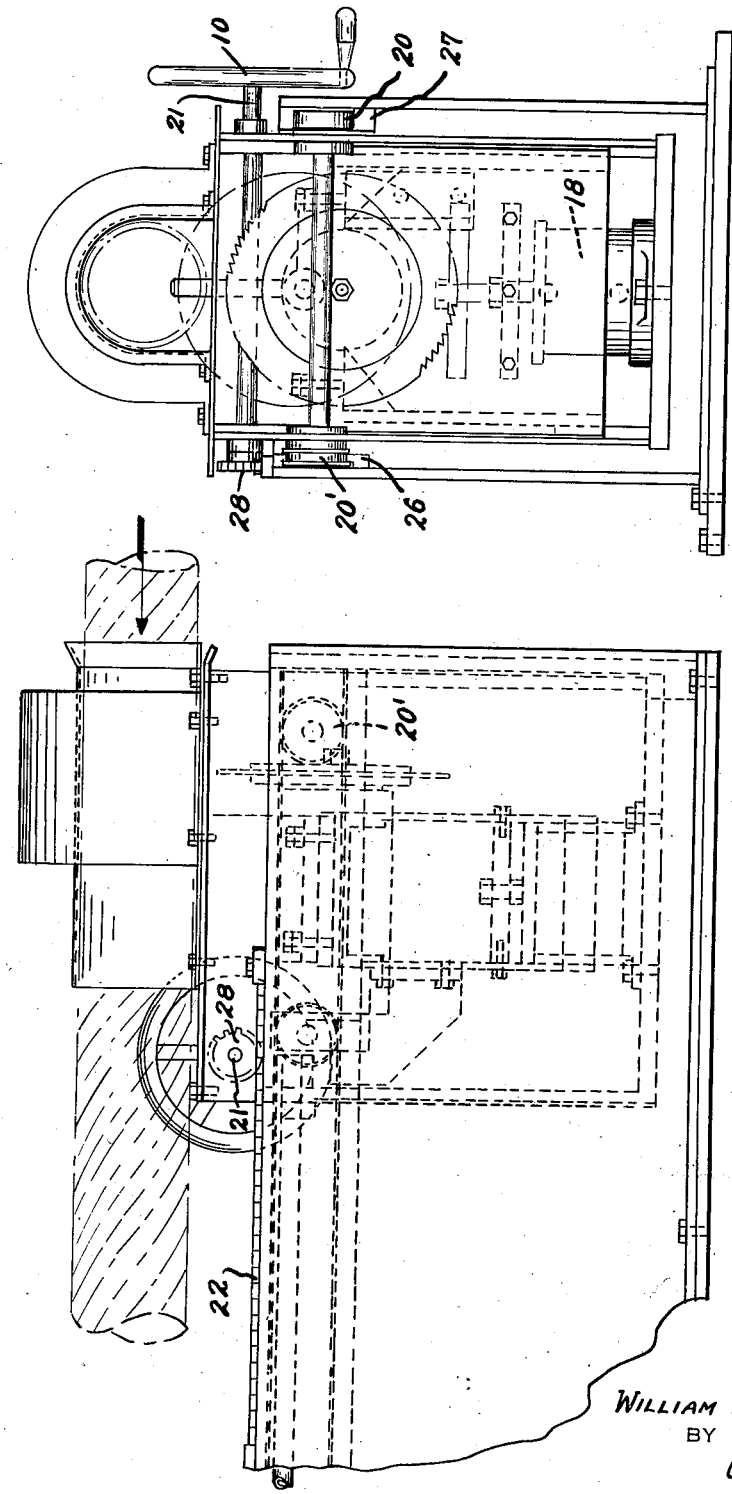
INVENTOR
WILLIAM E. McLAUGHLIN.
BY
Allen & Allen
ATTORNEYS.

Patented Apr. 9, 1940

2,196,639

UNITED STATES PATENT OFFICE 2,196,639

FLYING CUT-OFF MACHINE

William E. McLaughlin, Middletown, Ohio, assignor to The American Rolling Mill Company, Middletown, Ohio, a corporation of Ohio Application July 13, 1937, Serial No. 153,383

6 Claims. (Cl. 29—69)

This invention relates to a machine and method for cutting off predetermined lengths of fabricated material as the material comes off the fabricating unit, without interrupting the fabricating operation or stopping any part of the machine. More specifically this invention relates to a machine for cutting off predetermined lengths of helical lock seam pipe formed on a pipe machine.

In the past it has been customary to run the machine for a given length of time so as to fabricate a desired length of pipe and then stop the machine while the predetermined length of pipe is cut off. While such methods and machines have been proven quite satisfactory, they have been subject to the objection that they interrupt the continuity of production and slow up the machine, thereby decreasing its output over a unit period of time.

With the above factors in mind it is an object of my invention to provide a method of cutting off predetermined lengths of pipe or any other continuously fabricated material, without interrupting the continuity of fabrication, and without necessitating the stoppage of the machine.

It is another object of my invention to provide a machine which will cut off a length of material which is being fabricated during the fabrication and without interrupting the continuity thereof.

It is a further object of my invention to provide a machine as above outlined which may be adjusted to cut off any predetermined length of pipe or other fabricated material.

Other objects of my invention include the provision of a machine as above outlined, which will be relatively simple, cheap of construction, and which will be sure in its operation.

These and other objects of my invention which will be pointed out hereinafter, or which will be apparent to one skilled in the art upon reading these specifications, I accomplish by that method and by that construction and arrangement of parts of which I shall now describe an exemplary embodiment.

Reference is now made to the drawings forming a part of this specification and in which:

Figure 1 is a schematic plan view of a fabricating unit showing the relation thereof of my invention.

Fig. 2 is a side elevation of the same.

Fig. 3 is a side elevation of a cut off device according to my invention.

Fig. 5 is a side elevation of my machine taken from the opposite side from that shown in Fig. 3.

Fig. 6 is an end view of my invention as seen from the right of Fig. 5.

Fig. 7 is a somewhat diagrammatic representation of an automatic control and return, together with a wiring diagram therefor.

Figure 4:
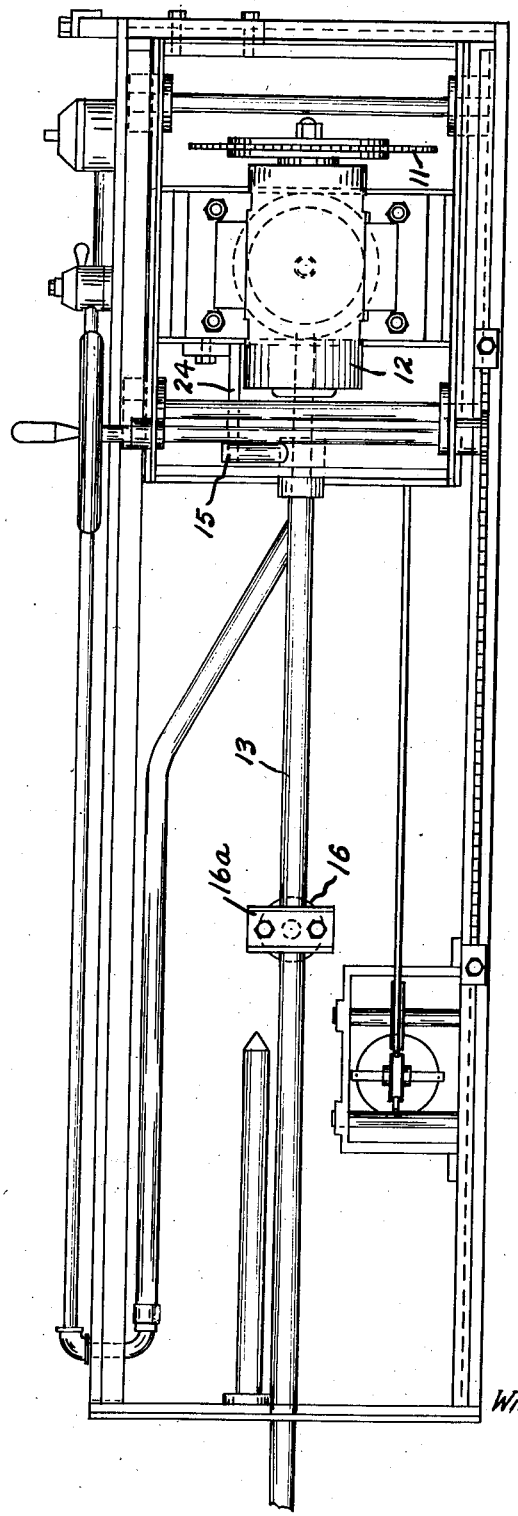
Fig. 4 is a plan view of the same.

Briefly in the practice of my invention, I provide a circular saw mounted for reciprocal movement in a vertical plane, said saw being mounted upon a carriage adapted to travel on brackets disposed parallel to the direction of movement of the fabricated material to be cut off. I provide an end gauge for engaging the end of the fabricated material, which gauge may be adjusted in regard to its distance from the plane of action of the circular saw, to determine the length of material to be cut off. This end gauge is fixed to the saw carriage so that the advancing end of the fabricated material bearing against the end gauge will cause the saw carriage to commence to move parallel to the fabricated material, and at the same speed as the latter. I provide means for causing the circular saw to be advanced into cutting relation with the fabricated material and to remove the end gauge from contact with the material as soon as the saw cut has commenced, whereby further movement of the saw carriage is brought about by engagement of the saw itself in the cut in the material being fabricated. I also provide means for reducing strain on the circular saw during this cut and movement, and for withdrawing the saw and returning the carriage when a cut is completed.

I have shown my invention in connection with a machine for manufacturing helical lock seam pipe such as that for example, disclosed and claimed in a co-pending application in the name of Jonathan R. Freeze, Serial No. 57,163, although it is to be understood that my invention is applicable to any machine for continuously fabricating any material.

Referring to Figs. 1 and 2, 1 indicates a coil or strip material which is to be formed into the helical pipe. 2 represents a flash welder for joining the trailing end of one coil to the leading end of a successive coil. 3 is a stripping apparatus for removing flashing from the strip after welding, and 4 represents the corrugating unit. The lock seaming unit is shown at 5, and my cut off machine is generally designated by the numeral 6, and the numeral 7 indicates the pile of cut off pipe. I have shown at 7a a piece of pipe which has just been cut off and it is ready to roll down upon the pile 7.

Referring to Fig. 3 which shows my invention more specifically, 8 is a switch for starting the saw motor, 9 is an air valve for raising or lowering the saw, and 10 is a hand wheel which may be used for returning the saw to the starting position after the completion of the cut. The circular saw itself is shown at 11, and the saw motor is shown at 12. 13 indicates a pipe or rod attached to the saw frame and carrying a stop 14, which is best seen in Fig. 1. The stop 14 is adjustably mounted upon the rod 13, which itself may be slidably mounted in the main frame. The upward and downward movement of the saw is produced by means of an air cylinder 18, which is an air cylinder of the double acting type controlled by the above mentioned valve 9.

As the pipe is formed and runs out to the desired length it hits the end stop 14 and thus starts to pull the saw carriage along at the same speed at which the formed pipe is travelling. The saw is started previous to, or as the carriage begins to move and air is admitted into the cylinder 18 to thrust the saw upward to commence its cutting action.

Mounted upon the saw carriage is a bracket 24 and mounted upon the rod 13 is a dog 15. Thus as the saw rises to commence its cut the bracket 24 strikes the dog 15, thus rotating the rod 13 and removing the end stop 14 from contact with the end of the pipe.

A weight 16 is mounted on the rod 13 by means of a clamp 16a, and tends to maintain the rod 13 in such an angular position that the end stop 14 is in operative position. As the saw carriage rises and rotates the end stop out of contact with the pipe as described, it does so against the pull of gravity exerted on the weight 16, and the saw carriage and rod 13 travels toward the left as seen in Fig. 4, or the right as seen in Fig. 3, until the end of the cut is reached. At this point the saw is withdrawn from the cut and as this is done the bracket 24 releases the dog 15 whereby the force of gravity acting upon the weight 16 tends to rock the rod 13 to restore the end gauge 14 to its operative position. By this time however, as best seen in Fig. 3, the member 16 has travelled to the right a sufficient distance to be prevented from returning to normal position by means of the bar 17. By this means when the cut is completed, and the saw is dropped clear the end gauge is kept out of contact with the cut off pipe by means of the pointed rod 17, which keeps the weight 16 out of normal position until the saw carriage is returned to its starting position.

The saw carriage itself as best seen in Figs. 5 and 6, is mounted on rollers 20 and 20'. The rollers 20' are preferably flanged in order to keep the carriage in perfect alignment upon the rails 26, while the rollers 20 may ride upon a plain track 27. A sprocket 28 is mounted upon the shaft 21 on which is mounted the hand wheel 10. The sprocket 28 engages a chain 22 mounted upon the main frame of the machine; thus by rotating the hand wheel 10 the sprocket 28 is caused to rotate and by coacting with the chain 22, serves to return the carriage to its starting position. The chain and sprocket of course function in the same manner as a rack and pinion.

As shown best in Fig. 3, I have provided means for reducing the strain on the saw during the cut, consisting of a weight 30 suspended from a pulley 31. The pulley 31 rides upon a cable 32, fastened to the machine frame as at 33 and passing over a fixed pulley 34 and connected to the saw carriage as at 35. The weight 30 is preferably so constituted as to balance the natural friction and inertia against movement of the saw carriage. Although the air valve 9 for actuating the air cylinder controlling the upward and downward movement of the saw may be operated by hand, it may in many instances be preferable to cause it to be operated automatically. To this end I have shown in Fig. 7, a somewhat diagrammatic representation of the saw carriage at 40, with the saw and motor indicated by the same reference numerals as before. In this instance the air valve 9 is provided with arms 41 and 42. Toward the right hand end of the travel of the saw carriage, I have pivoted at 43 a lever 44 which is connected to the arm 42 of the air valve by the bar 45. On the saw carriage I have provided a dog 46. As the saw carriage 40 begins to travel toward the right by virtue of the pull of the pipe on the rod 13, the switch 47 is closed, thereby energizing the relay 48 and starting the saw motor 12. As the carriage 40 travels further to the right, the dog 46 oscillates the arm 41 toward the right to the position indicated by "up." At this time air is admitted to the lower side of the air cylinder 18, whereby the saw is caused to rise and commence its cut. As the arm 41 is thrown to the right, and of course the arm 42 is thereby thrown toward the left, the bar 45 causes the lever 44 also to be thrown to the left to the position indicated by "up." Then as the carriage 40 reaches the end of its travel, the dog 46 throws the lever 44 back toward the right, thereby reversing the position of the valve 9, so that air is admitted to the upper side of the cylinder 18, and the saw is lowered.

It is to be understood that modifications of my invention may be made and that its application is not limited to the manufacture of helical lock seam pipe, although I have shown its operation in connection with the manufacture of such pipe, in an illustrative way. I therefore do not desire to limit myself otherwise than as pointed out in the claims which follow.

Having thus described my invention, what I claim as new and desire to secure by Letters Patent is:

1. In combination with a machine for continuously fabricating material, a device for cutting off lengths of fabricated material without interrupting the continuity of said fabrication, said device comprising a carriage movable in a path parallel to that of the fabricated material, means on said carriage adapted to be brought into engagement with the advance end of said fabricated material to cause said carriage to be advanced along its path at the same speed as the material, a cutter mounted on said carriage, means for causing said cutter to be advanced into cutting relation with said material during the movement of said carriage, means for withdrawing said engaging means when the cutting action has commenced, means for withdrawing said cutter when the cutting action is complete, so as to clear the fabricated material following the cut off portion, and means for returning said carriage to its initial position.

2. In combination with a machine for continuously fabricating material, a device for cutting off predetermined lengths of fabricated material without interrupting the continuity of said fabrication, said device comprising a carriage movable in a path parallel to that of the fabricated material, a cutter mounted on said carriage, means on said carriage adapted to be brought into engagement with the advance end of said fabricated material to cause said carriage to be advanced along its path at the same speed as the material, the relation between said cutter and engaging means being adjustable in accordance with said predetermined length, means for causing said cutter to be advanced into cutting relation with said material during the movement of said carriage, means for withdrawing said engaging means when the cutting action has commenced, means for withdrawing said cutter when the cutting action is complete, so as to clear the fabricated material following the cut off portion, and means for returning said carriage to its initial position.

3. In combination with a machine for continuously fabricating material, a device for cutting off lengths of fabricated material without interrupting the continuity of said fabrication, said device comprising a carriage movable in a path parallel to that of the fabricated material, means on said carriage adapted to be brought into engagement with the advance end of said fabricated material to cause said carriage to be advanced along its path at the same speed as the material, a cutter mounted on said carriage, means for causing said cutter to be advanced into cutting relation with said material during the movement of said carriage, means operative in response to the beginning of the cutting action for withdrawing said engaging means, means for withdrawing said cutter when the cutting action is complete, so as to clear the fabricated material following the cut off portion, means for holding said engaging means out of operative position until said cut off portion has cleared the engaging means, means for returning said carriage to its initial position, and means operative incident to the return of the carriage to return said engaging means to operative position.

4. In combination with a machine for continuously fabricating material, a device for cutting off lengths of fabricated material without interrupting the continuity of said fabrication, said device comprising a carriage movable in a path parallel to that of the fabricated material, means for causing said carriage to travel over said path at the same speed as said material, a cutter mounted on said carriage, and means operative in response to the commencement of said travel, for causing said cutter to be advanced into cutting relation with said material during the movement of said carriage, and means operable substantially concurrently with the commencement of the cutting action for rendering said first mentioned means inoperative, whereby further movement of the carriage with the material is brought about solely by engagement thereof with the cutter.

5. In combination with a machine for continuously fabricating material, a device for cutting off lengths of fabricated material without interrupting the continuity of said fabrication, said device comprising a carriage movable in a path parallel to that of the fabricated material, means on said carriage adapted to be brought into engagement with the advance end of said fabricated material to cause said carriage to be advanced along its path at the same speed as the material, a cutter mounted on said carriage, means operative in response to the commencement of said travel for causing said cutter to be advanced into cutting relation with said material during the movement of said carriage, means operative in response to the beginning of the cutting action for withdrawing said engaging means, means operative when said carriage has travelled a predetermined distance sufficient to complete the cutting action, for withdrawing said cutter when the cutting action is complete, so as to clear the fabricated material following the cut off portion, means for holding said engaging means out of operative position until said cut off portion has cleared the engaging means, means for returning said carriage to its initial position, and means operative incident to the return of the carriage to return said engaging means to operative position.

6. That method of cutting off lengths of fabricated material without interrupting the fabrication thereof, which includes the steps of moving a cutter into cutting engagement with said material while moving said cutter parallel to said material and at the same speed, and thereafter causing said fabricated material to transport said cutter with it solely by engagement thereof with said cutter until said cutting operation is complete.

WILLIAM E. McLAUGHLIN.